(12) United States Patent
St-Hilaire et al.

(10) Patent No.: US 12,202,127 B2
(45) Date of Patent: Jan. 21, 2025

(54) ADJUSTABLE SUCTION GRIPPER

(71) Applicant: ROBOTIQ INC., Saint-Nicolas (CA)

(72) Inventors: Julien St-Hilaire, Lévis (CA); André Bourget, Québec (CA); Renaud Sansfaçon, Québec (CA); Sacha Fabien, Québec (CA); Pierre-Luc Belzile, Lévis (CA); Valérie Lavoie, Saint-Augustin-de-desmaures (CA); Yan Drolet Mihelic, Québec (CA); Louis-Alexis Allen Demers, Levis (CA); Jean-Philippe Jobin, Lévis (CA)

( * ) Notice: Subject to any disclaimer, the term of this patent is extended or adjusted under 35 U.S.C. 154(b) by 682 days.

(21) Appl. No.: 17/441,846

(22) PCT Filed: Mar. 31, 2020

(86) PCT No.: PCT/CA2020/050416
§ 371 (c)(1),
(2) Date: Sep. 22, 2021

(87) PCT Pub. No.: WO2020/198857
PCT Pub. Date: Oct. 8, 2020

(65) Prior Publication Data
US 2022/0184818 A1    Jun. 16, 2022

Related U.S. Application Data

(60) Provisional application No. 62/827,110, filed on Mar. 31, 2019.

(51) Int. Cl.
*B25J 15/06*    (2006.01)
(52) U.S. Cl.
CPC ................ *B25J 15/0616* (2013.01)

(58) Field of Classification Search
CPC ................ B25J 15/0683; B25J 15/0691; B25J 15/0616; H01L 21/6838; H01L 21/3838; B25G 47/91
(Continued)

(56) References Cited

U.S. PATENT DOCUMENTS 2,903,290 A * 9/1959 Morris ................... A01K 43/00
                                                        53/247
4,088,312 A   5/1978 Frosch et al.
(Continued)

FOREIGN PATENT DOCUMENTS

CN    107972054 A    5/2018
CN    207432234 U    6/2018
(Continued)

OTHER PUBLICATIONS

International application No. PCT/CA2020/050416 International Search Report dated Jun. 19, 2020.
(Continued)

*Primary Examiner* — Paul T Chin
(74) *Attorney, Agent, or Firm* — Anglehart et al.

(57) ABSTRACT

A gripper may include a plate, a suction manifold, one or more attachment mechanisms, and one or more suction cups. The plate may have a body and one or more extremities and each extremity may have one or more slots formed therethrough. The suction manifold may be connected to the body of the plate. The one or more suction cups may each be attached to the plate via one of the attachment mechanisms and may be fluidly connected to the suction manifold. The attachment mechanisms may each extend through one of the slots of the plate. Each attachment mechanism may be configured to be tightened, loosened, and repositioned by hand.

22 Claims, 13 Drawing Sheets

(58) Field of Classification Search
USPC .......................................... 294/183, 188, 189
See application file for complete search history.

(56) References Cited

U.S. PATENT DOCUMENTS

| | | | |
|---|---|---|---|
| 4,129,328 | A | 12/1978 | Littell |
| 4,587,716 | A | 5/1986 | Bytow |
| 5,193,776 | A | 3/1993 | Nagai et al. |
| 5,387,068 | A | 2/1995 | Pearson |
| 5,609,377 | A * | 3/1997 | Tanaka ................ B65G 47/918 901/46 |
| 5,746,567 | A | 5/1998 | Herbermann et al. |
| 5,988,718 | A | 11/1999 | Sugimoto et al. |
| 6,394,519 | B1 | 5/2002 | Byers et al. |
| 6,454,334 | B2 * | 9/2002 | Massow ............... B25J 15/0616 294/81.2 |
| 6,502,877 | B2 | 1/2003 | Schick et al. |
| 6,835,040 | B2 | 12/2004 | Quiring |
| 7,234,744 | B2 | 6/2007 | Osten et al. |
| 7,390,040 | B2 | 6/2008 | Subotincic |
| 8,857,877 | B2 | 10/2014 | Lin et al. |
| 9,962,828 | B2 * | 5/2018 | Barber ................ B25J 15/0616 |
| 10,011,023 | B1 | 7/2018 | Lin et al. |
| 10,926,403 | B1 * | 2/2021 | Asokan ............... B25J 15/0052 |
| 11,383,392 | B2 * | 7/2022 | Lorenz ................ B25J 15/0616 |
| 2006/0196913 | A1 | 9/2006 | Zirbs |
| 2008/0246290 | A1 * | 10/2008 | Johansson .............. B25J 19/007 294/65 |
| 2010/0133405 | A1 | 6/2010 | Jeon |
| 2011/0030318 | A1 * | 2/2011 | Moylan ..................... B65B 5/04 53/458 |
| 2017/0320679 | A1 | 11/2017 | Crosby |
| 2018/0326561 | A1 | 11/2018 | Lee et al. |

FOREIGN PATENT DOCUMENTS

| | | |
|---|---|---|
| DE | 102011075625 A1 | 11/2012 |
| DE | 102015002433 A1 | 9/2016 |
| FR | 2566310 A1 | 12/1985 |
| FR | 2974024 A1 | 10/2012 |
| IN | 207682405 U | 8/2018 |
| KR | 101507724 B1 | 4/2015 |
| WO | 2002/043930 A1 | 6/2002 |

OTHER PUBLICATIONS

International application No. PCT/CA2020/050416 Search Strategy dated Jun. 19, 2020.
International application No. PCT/CA2020/050416 Written Opinion of the International Searching Authority dated Jun. 19, 2020.

* cited by examiner

ADJUSTABLE SUCTION GRIPPER

CROSS-REFERENCE TO RELATED APPLICATIONS

This application claims priority to U.S. Provisional Application No. 62/827,110 which was filed on Mar. 31, 2019.

FIELD OF THE INVENTION

The present disclosure relates to robotic grippers for use in collaborative environments.

BACKGROUND

In collaborative environments, humans and robots work alongside each other to complete tasks. Collaborative environments may present unique opportunities to complete complex tasks that include steps best performed by humans and steps best performed by robots. In many cases, a single robot may be used to perform different tasks. For example, a robot may be used to lift numerous different types of objects. In such an example, a single robotic arm or other type of robot may be suitable to lift objects of different sizes, shapes, weights, or surface structures.

Although a single robot may be suitable to lift many different types of objects, an end effector gripper of the robot may require reconfiguration to lift the different types of objects. For example, the suction cups of a suction gripper may be adjusted to be closer or farther apart depending on the size of the object being lifted. Reconfiguring a gripper may generally require the use of tools, which may cause significant delays in methods performed using the gripper. This may reduce the overall productivity of the method, thereby increasing the time and cost of the method. Therefore, there is need for a gripper which may be readily configured for different tasks.

SUMMARY

The present disclosure addresses the shortcomings of grippers described above. In particular, the present disclosure provides grippers which may be configured by hand/without the use of tools and methods of using such grippers. This may provide significant improvements in the time, cost, and ease with which collaborative tasks may be performed.

In one aspect, the present disclosure relates to a gripper which may include a plate, a suction manifold, one or more attachment mechanisms, and one or more suction cups. The plate may have a body and one or more extremities and each extremity may have one or more slots formed therethrough. The suction manifold may be connected to the body of the plate. The one or more suction cups may each be attached to the plate via one of the attachment mechanisms and may be fluidly connected to the suction manifold. The attachment mechanisms may each extend through one of the slots of the plate. Each attachment mechanism may be configured to be tightened, loosened, and repositioned by hand.

In some embodiments, each of the one or more attachment mechanisms may include an upper cap disposed above the plate and comprising a threaded portion extending through one of the one or more slots; and a lower cap disposed below the plate, attached to the upper cap, and attached to one of the one or more suction cups.

In some embodiments, the upper caps and the lower caps may be configured to be screwed together.

In some embodiments, at least one of the upper caps and the lower caps may include gripping features.

In some embodiments, a flowpath may be formed through the upper cap and the lower cap.

In some embodiments, each suction cup may be screwed onto one of the one or more attachment mechanisms.

In some embodiments, the one or more extremities may include one or more arms.

In some embodiments, the one or more extremities may include an external ring.

In some embodiments, the source of suction may include a suction manifold mounted on the body of the plate.

In some embodiments, the manifold may be fluidly connected to the suction cups via one or more flexible tubes.

In some embodiments, the manifold may include one or more outlets and each outlet is fluidly connected to one of the one or more suction cups.

In some embodiments, each of the attachment mechanisms may be configured to be tightened and loosened using less than three Newton-meters of torque.

In some embodiments, the gripper may include a mounting component.

In some embodiments, the one or more attachment features may include one or more slots and wherein each attachment mechanism may be adjustable within one of the slots.

In some embodiments, the one or more attachment features may include one or more rows of holes, and wherein each attachment mechanism may be movable between holes in a row of holes.

Another broad aspect is a system including the gripper as described herein and a robot, wherein the gripper is configured as an end effector of the robot.

In some embodiments, the robot may be a robotic arm.

In another aspect, the present disclosure relates to a method of using a gripper, which may include the following steps: configuring the gripper in a first configuration, gripping one or more objects of a first type, configuring the gripper in a new configuration, and gripping one or more of the objects a new type. Configuring the gripper in a new configuration and gripping objects of a new type may be repeated any number of times. Configuring the gripper may comprise adjusting the gripper by hand.

In some embodiments, configuring the gripper may include loosening one or more attachment mechanisms of the gripper; positioning the one or more attachment mechanisms; and tightening one or more attachment mechanisms.

In some embodiments, the method may include repeating gripping one or more of the objects of a new type and gripping one or more of the objects of a new type any number of times.

In some embodiments, configuring the gripper may include applying three Newton-meters or less of torque to one or more of the attachment mechanisms.

In some embodiments, gripping the one or more objects of each type may include applying suction force to the object.

In another aspect, the present disclosure relates to a gripper which includes the following elements: a plate comprising a body and one or more extremities, each extremity of the one or more extremities comprising one or more attachment features; one or more attachment mechanisms extending through the one or more the attachment features, wherein each of the one or more attachment mechanisms is configured to receive a suction cup; and one or more conduits fluidly connected to the one or more attachment mechanisms, and configured to provide suction to the suction cup, when received at the each of the one or more attachment mechanisms, from a source of suction. Each attachment mechanism may be adjustable within one of the attachment features. Each attachment mechanism may be configured to be tightened, loosened, and repositioned by hand.

In some embodiments, one or more suction cups may be received by one or more of the attachment mechanisms and fluidly connected to the conduits. Accordingly, suction may be transferred from the source of suction to the one or more suction cups, allowing the suction cups to grip objects. In some embodiments, one or more of the attachment mechanisms may not be attached to suction cups and one or more of the conduits may be blocked such that they do not transfer suction. In some embodiments, suction cups of different sizes, shapes, or configurations may be attached to the attachment mechanisms.

Additional aspects and advantages of the present disclosure will be apparent from the following description and claims.

BRIEF DESCRIPTION OF THE DRAWINGS

The invention will be better understood by way of the following detailed description of embodiments of the invention with reference to the appended drawings, in which.

DETAILED DESCRIPTION

In general, the present disclosure relates to robotic grippers and methods of using robotic grippers in collaborative environments. In one aspect, the present disclosure relates to a gripper. The gripper may be a suction gripper and may have multiple configurations enabling it to grip objects of different sizes and shapes. The gripper may be adjustable between these different configurations by hand/without the use of tools. In another aspect, the present disclosure relates to and a method of using a gripper in a collaborative environment. The gripper may be used as the end effector of a robot and it may be adjusted by hand/without the use of tools.

In this disclosure, figures are labeled with three-digit reference signs. The first digit of a reference sign indicates the figure in which the reference sign is used. For example, reference signs beginning with "2" refer to FIG. 2. The final two digits of a reference sign refer to the element being identified. For example, any reference sign ending with "00" refers to a gripper.

As discussed above, some embodiments of the present disclosure are directed towards grippers. Exemplary grippers in accordance with the present disclosure are illustrated in FIGS. 1-4. Gripper components are illustrated in FIGS. 5A-5D. One skilled in the art will recognize that a gripper may include a combination of features illustrated in different Figures, may include a subset of features illustrated in a Figure, and/or may include features not illustrated herein combined with features disclosed below, without departing from the scope of the present disclosure.

Figure 1A:
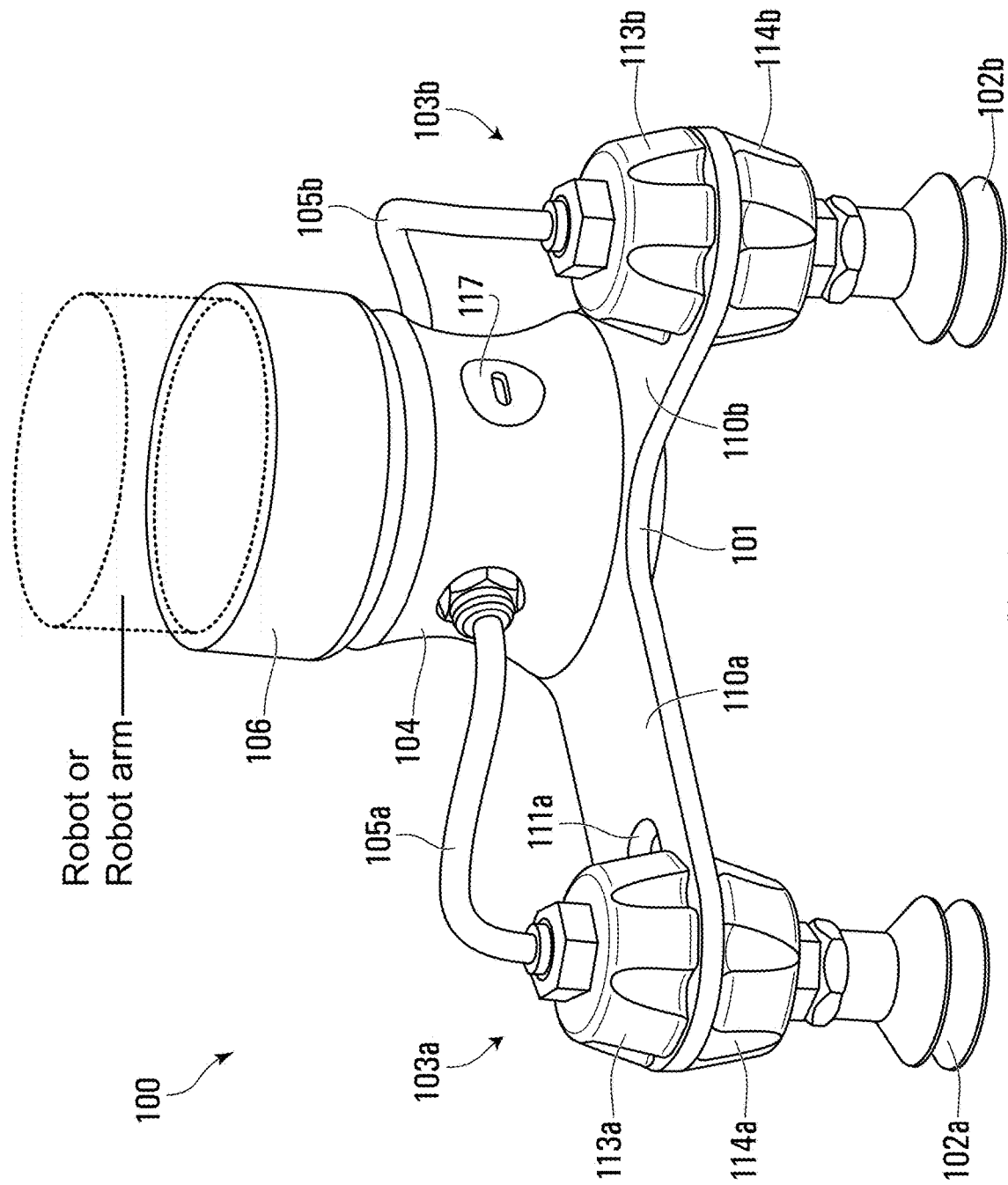
FIGS. 1A-1B are drawings of a gripper in accordance with the present disclosure.
Figure 1B:
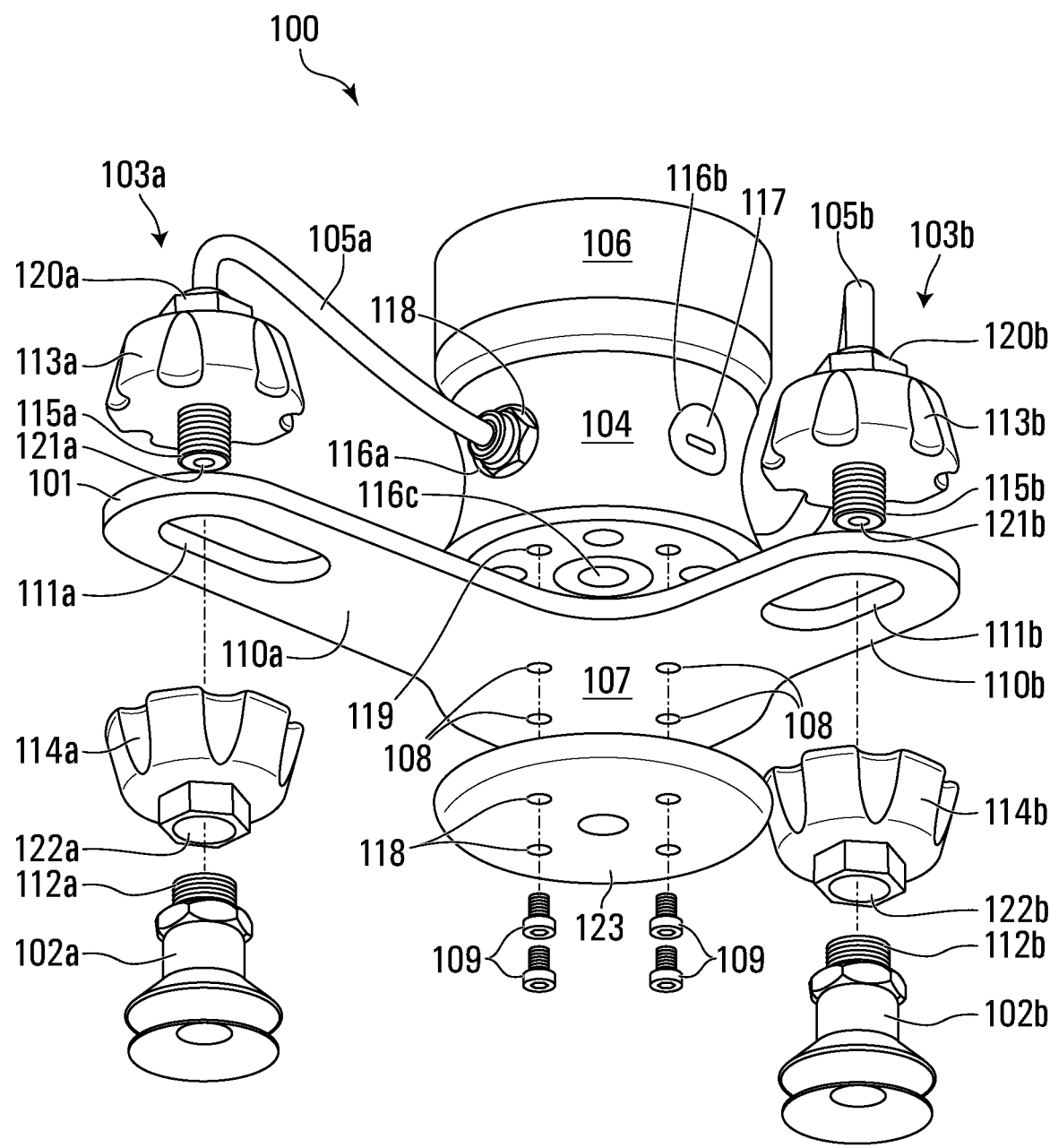

FIGS. 1A-1B illustrate a gripper 100. FIG. 1A shows a plan view of the gripper 100 as assembled and FIG. 1B shows an exploded view of the gripper 100. The gripper 100 may include the following elements: a plate 101; a suction manifold 104; flowlines 105a, 105b; suction cups 102a, 102b; and attachment mechanisms 103a, 103b. Each of these elements will be described in detail below. One skilled in the art will recognize that a gripper in accordance with the present disclosure may not include every element described below and may include elements described below in combination with elements that are not described. For example, a gripper may not be provided with suction cups, where the suction cups may be fastened to the attachment mechanisms prior to use, exchanged to vary the dimensions of the suction cups between use, etc.

The plate 101 may provide support for other elements of the gripper 100, including the suction cups 102a, 102b and the suction manifold 104. The plate 101 may include a body 107 on which the suction manifold 104 may be mounted. The body 107 may have holes 108 formed therethrough, to facilitate the attachment of the plate 101 to the suction manifold 104. As shown in FIGS. 1A-1B, the plate 101 may be screwed onto the suction manifold 104 using screws 109. In some embodiments, the suction manifold 104 may be attached to the plate 101 via other means. In some embodiments, as shown in FIGS. 1A-1B, the body 107 may have a similar profile to the suction manifold 104, such that the edges of the suction manifold 104 align with the edges of the body 107. In some embodiments, the body 107 may have a smaller, larger, and/or differently shaped profile than the suction manifold 104.

The plate 101 may also include one or more arms 110a, 110b extending from the body 107. FIGS. 1A-1B illustrate a plate 101 with two arms 110a, 110b; further Figures will illustrate plates with different numbers and configurations of arms (see FIGS. 3 and 4) and plates with extremities other than arms (see FIG. 2). The arms 110a, 110b may extend from the body 107 at any angle from each other. In some embodiments, the arms may extend at an angle between 30° and 180° from each other, between 45° and 135° from each other, or, as illustrated in FIGS. 1A-1B, at approximately 90° from each other. The arms 110a, 110b may each have any length and may have the same length as each other or have different lengths. In some embodiments, the first arm 110a may have a length between one and thirty centimeters, between three and eighteen centimeters, or between five and ten centimeters. In some embodiments, the second arm 110b may have a length between one and thirty centimeters, between three and eighteen centimeters, or between five and ten centimeters. The lengths of the arms 110a, 110b and the angle between the arms 110a, 110b may be determined based on the size and shape of objects which the gripper 100 is intended to lift. In some embodiments, the arms may be significantly longer than the ranges suggested here. In some embodiments, the arms 110 may not be straight, instead having, e.g., an elbow, or may be curved.

Slots 111a, 111b may be formed in arms 110a, 110b of the plate 101. The slots 111a, 111b may facilitate both the attachment of the suction cups 102a, 102b to the plate 101 and the adjustment of the position of the suction cups 102a, 102b. This functionality will be discussed below when the attachment mechanisms 103a, 103b are described. The length of the slots 111a, 111b may or may not be proportional to the lengths of the arms 110a, 110b. For example, if the first arm 110a is longer than the second arm 110b, the first slot 111a may be longer than the second slot 111b. In some embodiments, the length of the slots 111a and 111b may be parallel with axes running along the length of their respective arms 110a and 110b, where in other embodiments, they may not be parallel, but may instead be orthogonal or skew.

The plate 101 may include attachment features which allow the attachment mechanisms 103a, 103b to be attached thereto, other than slots 111a, 111b. In some embodiments, the plate 101 may comprise rows of holes (not illustrated) instead of slots. For example, each slot 111a, 111b may be replaced with a row of holes covering approximately the same length along each arm 110a, 110b as the slot 111a, 111b. Each row of holes may comprise two or more holes. The arms 110a, 110b may or may not have the same number of holes. The holes may facilitate the attachment of the suction cups 102a, 102b to the plate 101 and the adjustment of the position of the suction cups 102a, 102b. This functionality will be discussed below when the attachment mechanisms 103a, 103b are described.

As discussed above, the suction manifold 104 may be mounted on the body 107 of the plate 101. Threaded holes 119 or other attachment features may be formed on the bottom surface of the suction manifold 104 to facilitate this mounting. The suction manifold 104 may receive an input suction at an inlet (not illustrated) and may transfer this suction to one or more outlets 116a, 116b, 116c. One or more outlets (e.g. 116a, 116b, 116c) may each be fluidly connected to a suction cup (e.g. 102a, 102b, 102c). These outlets may be outfitted with fittings 118 to facilitate attachment to the flowlines 105a, 105b. In some embodiments, all of the outlets may be fluidly connected to suction cups. In some embodiments, as illustrated in FIGS. 1A-1B, one or more outlets 116b, 116c may be blocked, using either a plug 117 or the plate 101. The suction manifold 104 will be described in more detail below with respect to FIGS. 5A-5D, which illustrate a suction manifold, fittings, and plugs.

In some embodiments, an alternate suction source, such as a vacuum pump (not illustrated) or a suction motor (not illustrated) may be used instead of the suction manifold 104. The vacuum pump may be mounted on the plate 101 in a similar manner to that which has been described for the suction manifold 104. The vacuum pump may be fluidly connected to each of the suction cups 102. The vacuum pump may be any type of pump known in the art. It may be capable of providing sufficient suction to each of the suction cups 102 to grip objects as desired. The vacuum pump may be battery powered, or power may be provided to it via an electrical cable. In some embodiments, suction may be provided via a venturi. In other words, compressed air may be used to create suction. In such embodiments, a compressor or a compressed air source may be fluidly connected to the suction cups 102a, 102b and may or may not be mounted on the plate 101.

The flowlines 105a, 105b may be attached to one or more outlets 116a of the suction manifold 104 via the fittings 118, at a first end. At a second end, the flowlines 105a, 105b may each be attached to an attachment mechanism 103a, 103b. Thus, the flowlines 105a, 105b may transfer suction from the manifold 104 to the attachment mechanisms 103a, 103b. The flowlines 105a, 105b may have sufficient length, diameter, and flexibility to accommodate the positioning of the attachment mechanisms 103a, 103b which is described below. The flowlines 105a, 105b may comprise any type of flexible hosing known in the art.

The suction cups 102a, 102b may be configured to apply suction to an object (not shown) with which they are brought into contact. This suction may enable the gripper 100 to lift the object. The suction cups 102a, 102b may any type of suction cups known in the art. The suction cups 102a, 102b may include threaded surfaces 112a, 112b for connection to the attachment mechanisms 103a, 103b. In some embodiments, the suction cups 102a, 102b may connect to the attachment mechanisms 103a, 103b via other means, such as press fitting, interlocking, or any other means known in the art.

The attachment mechanisms 103a, 103b may attach the suction cups 102a, 102b to the plate 101, enable the adjustment of the position of the suction cups 102a, 102b within the slots 111a, 111b, and transfer suction from the flowlines 105a, 105b to the suction cups 102a, 102b. Each attachment mechanism 103a, 103b may include an upper cap 113a, 113b and a lower cap 114a, 114b. The upper cap 113a, 113b may attach to the lower cap 114a, 114b through a slot 111a, 111b of the plate 101, such that tightening the upper cap 113a, 113b to the lower cap 114a, 114b may secure the caps 113, 114 to the plate 101. The upper caps 113a, 113b may include protruding threaded portions 115a, 115b which extend through the slots 111a, 111b of the plate 101 and the lower caps may include corresponding recessed threaded portions (not illustrated). One skilled in the art may readily envision variations to this mechanism. For example, the locations of the protruding threaded portion and the recessed threaded portion may be reversed, or interlocking features other than threads may be used. Any such variations are within the scope of this disclosure. For example, a "quick-clip" attachment, in which the caps 113, 114 snap together may be used. The quick-clip attachment may include features which allow the caps 113, 114 to be locked together and unlocked from each other.

The upper caps 113a, 113b may be configured to attach to the flowlines 105a, 105b. The upper caps 113a, 113b may be outfitted with fittings 120a, 120b which connect to the flowlines 105a, 105b. The fittings 120a, 120b and the flowlines 105a, 105b may mate through friction fitting or through some interlocking mechanism, such as ridges or threads. The fittings 120a, 120b may lock to the flowlines 105a, 105b.

The lower caps 114a, 114b may be configured to attach to the suction cups 102a, 102b. The threaded surfaces 112a, 112b of the suction cups 102a, 102b may screw into the lower caps 114a, 114b, or may connect to the lower caps 114a, 114b by some other means. In this way, positioning an attachment mechanism 103a, 103b may comprise positioning the attached suction cup 102a, 102b.

Positioning an attachment mechanism 103a, 103b may comprise sliding the upper cap 113a, 113b and the lower cap 114a, 114b within a slot 111a, 111b of the plate 101 while the caps 113, 114 are partially screwed together. The threaded portions 115a, 115b may be sized to move easily within the slots 111a, 111b. In some embodiments, the upper cap 113a, 113b may be positioned within the slot prior to attachment of the lower cap 114a, 114b. After the attachment mechanism 103a, 103b has been slid to a desired position, the caps 113, 114 may be fully screwed together to maintain the attachment mechanism 103a, 103b in that position. The positions in which the attachment mechanisms 103a, 103b are placed may depend on the desired positions of the suction cups 102a, 102b, which may be determined based on the size, shape, or other properties of the object which the gripper 100 will grip.

As discussed above, a plate 101 may comprise rows of holes instead of slots 111a, 111b. In such embodiments, positioning an attachment mechanism 103a, 103b may comprise connecting an upper cap 113a, 113b to a lower cap 114a, 114b through a particular hole, such that the caps attachment mechanism 103a, 103b is at a desired position. In some embodiments, connecting the caps 113, 114 may comprise screwing them together through the hole.

A flowpath may be provided through the attachment mechanisms 103a, 103b to permit the transfer of suction from the flowlines 105a, 105b to the suction cups 102a, 102b. The flowpath may comprise a bore 121a, 121b extending through the upper cap 113a, 113b and a bore 122a, 122b extending through the lower cap 114a, 114b. The bores 121, 122 may be concentric and have equal diameters.

In some embodiments, the slots 111a, 111b and/or the attachment mechanisms 103a, 103b may include features that make it easier to locate the suction cups 102a, 102b at preset locations. These features may be notches, ridges, markers, extensions, or any other features known in the art for providing preset location between elements which translate relative to each other.

The attachment mechanisms 103a, 103b may be able to be tightened, loosened, and positioned by hand/without the use of tools. The attachment mechanisms may include features which decrease the amount of force necessary to tighten and loosen them. For example, the upper caps 113a, 113b and the lower caps 114a, 114b may have a large outer diameter compared to the diameter of their threaded portions 115a, 115b. In some embodiments, outer diameter of the upper caps 113a, 113b may be between one and seven centimeters, between two and five centimeters, or approximately three centimeters. In some embodiments, the outer diameter of the lower caps 114a, 114b may be between one and seven centimeters, between two and five centimeters, or approximately three centimeters. In some embodiments, the diameter of the threaded portions 115a, 115b may be between one half and three centimeters, between one and two centimeters, or approximately one and one quarter centimeters. In some embodiments, the attachment mechanisms 103a, 103b may include features which increase the ease with which they may be tightened, loosened, and/or positioned by hand. For example, as shown in FIGS. 1A-1B, the upper caps 113a, 113b and the lower caps 114a, 114b may include ridges on their outer surfaces which may enable a user to grip them more easily and/or tightly. The upper caps 113a, 113b and/or the lower caps 114a, 114b may include rotating locking features, which may enhance the ability of an operator to tighten the attachment mechanism by hand.

In some embodiments, the attachment mechanisms 103a, 103b may be able to be tightened through the application of less than ten Newton-meters of torque, less than five Newton-meters of torque, less than three Newton-meters of torque, or less than one Newton-meters of torque. In some embodiments, the attachment mechanisms 103a, 103b may be able to be loosened through the application of less than ten Newton-meters of torque, less than five Newton-meters of torque, less than three Newton-meters of torque, or less than one Newton-meters of torque. The amount of force required to tighten and loosen the attachment mechanisms 103a, 103b may be less than the amount of force an average healthy adult can apply by hand. Positioning the attachment mechanisms 103a, 103b within the slots 111a, 111b may not require a significant amount of force.

The gripper 100 may further include a mounting component 106 and a lower cap 123. The mounting component 106 may be attached to an upper surface of the suction manifold 104 and may comprise a flowpath (not illustrated) formed therethrough to allow suction to be transferred to the suction manifold 104. The mounting component may facilitate attachment of the gripper 100 to a robotic arm (not illustrated), such that the gripper 100 may be used as an end effector of the robotic arm. In some embodiments, the mounting component 106 may include a force sensor, a torque sensor, wrist camera, and/or other sensors. In some embodiments, the gripper 100 may not include a mounting component 106; instead, the suction manifold 104 may be configured to attach directly to the robotic arm. The lower cap 123 may be attached to the lower side of the plate 101 and may facilitate the attachment of the plate 101 to the suction manifold 104.

Figure 2A:
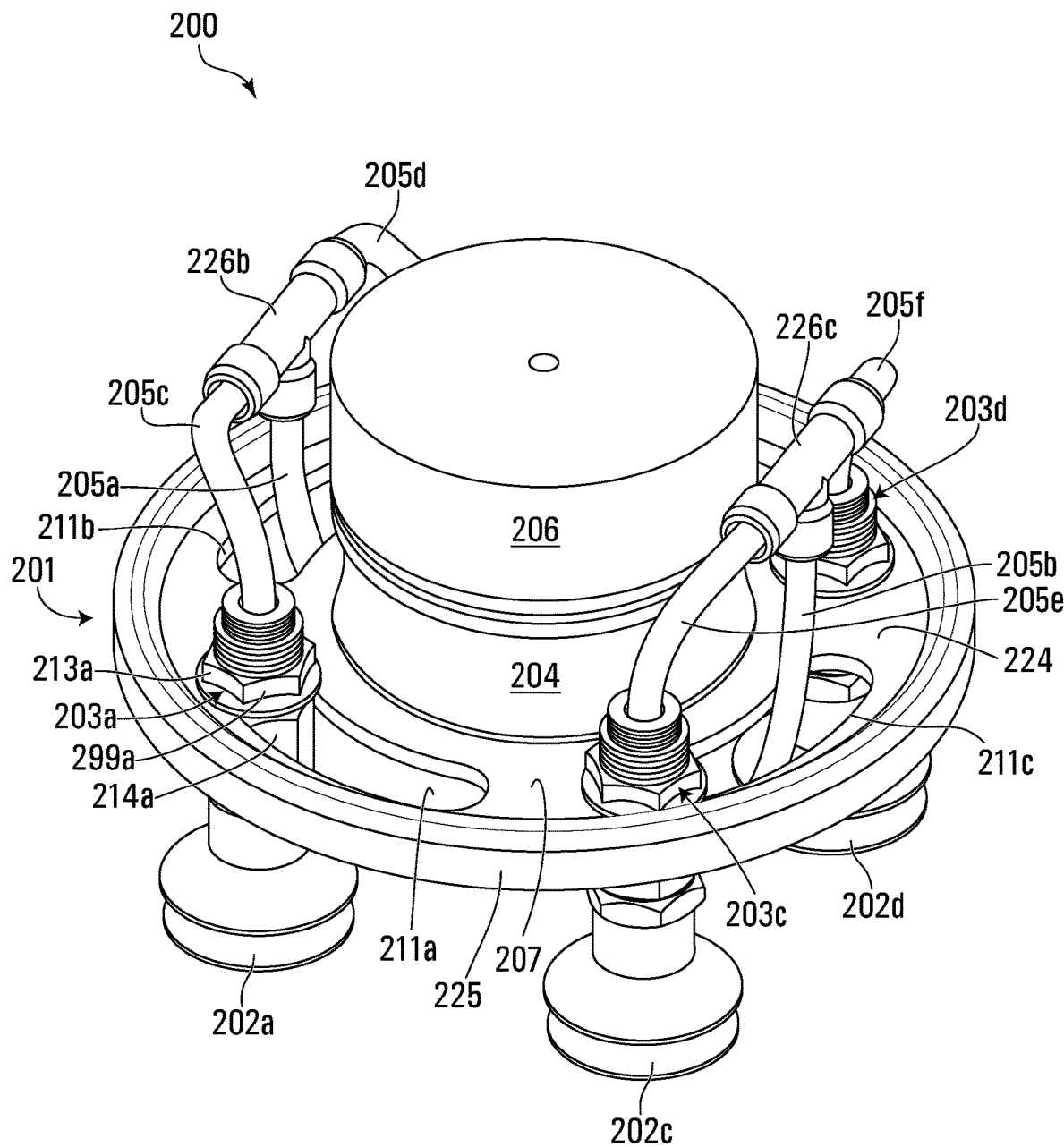
FIGS. 2A-2C are drawings of a gripper in accordance with the present disclosure.
Figure 2B:
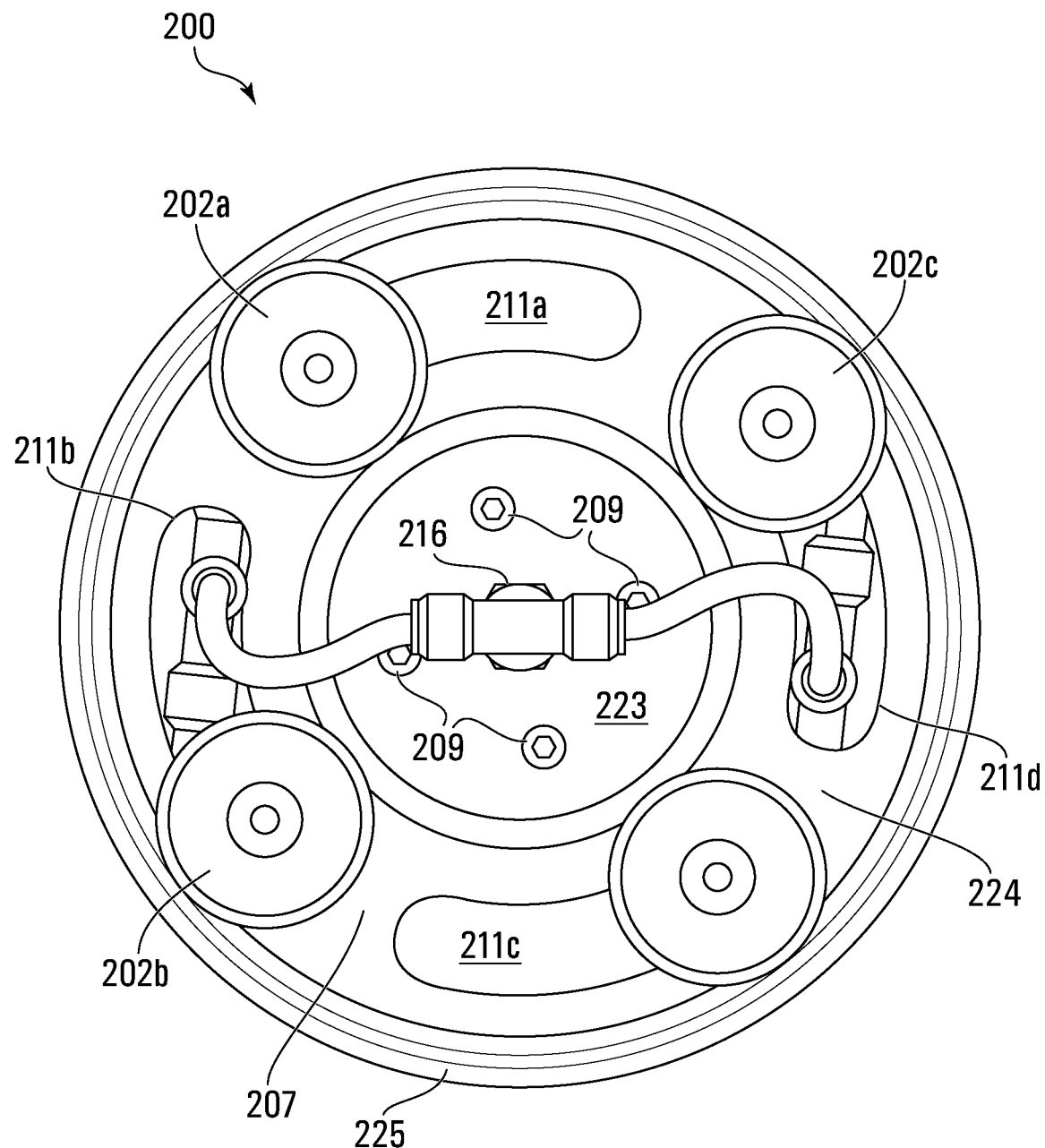
Figure 2C:
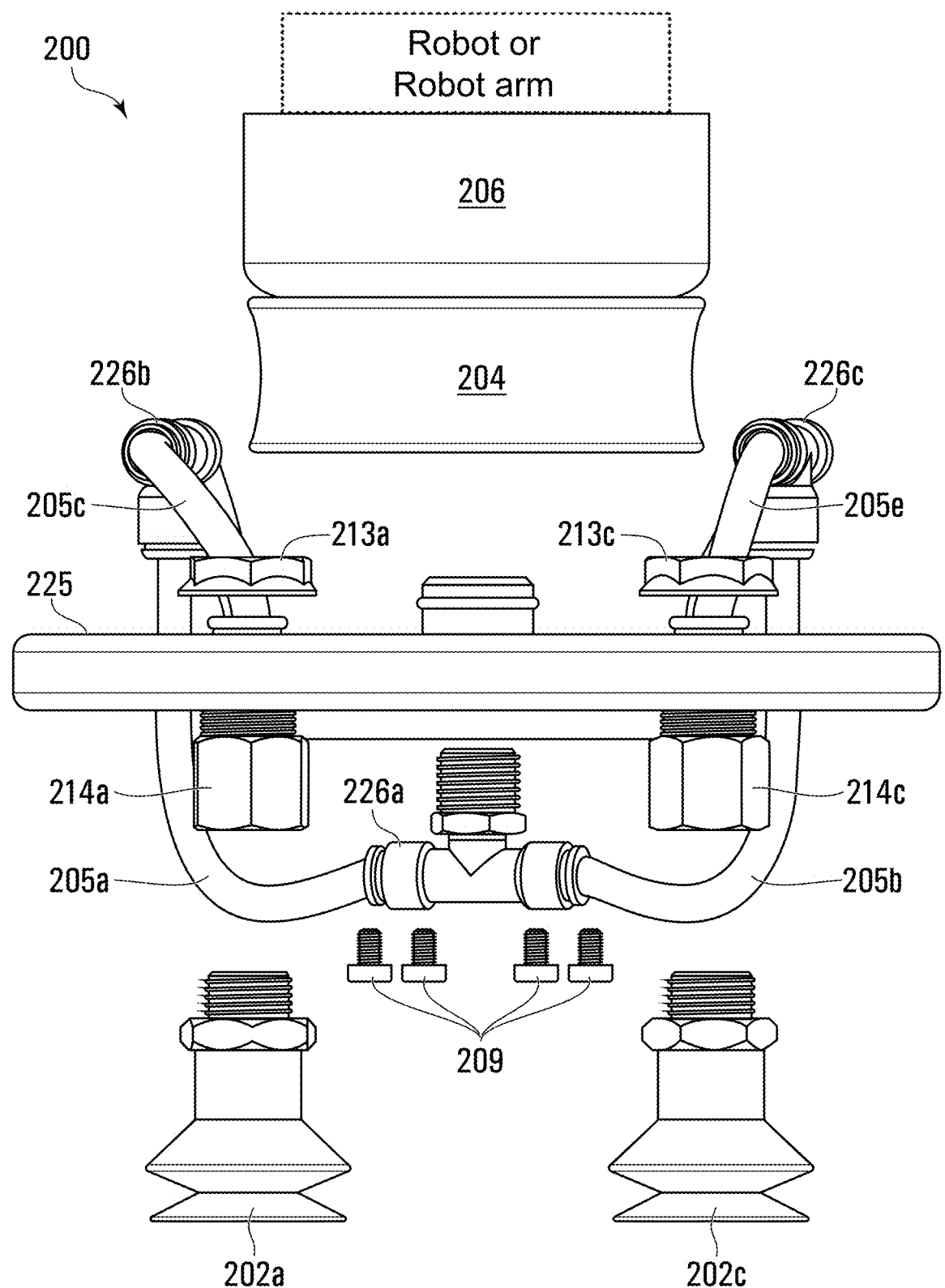

FIGS. 2A-2C illustrate a gripper 200. FIG. 2A shows a plan view of the gripper 200 as assembled and FIG. 2B shows a bottom view of the gripper 200. The gripper 200 may include many of the same elements as the gripper 100 illustrated in FIGS. 1A-1B and described in detail above. Elements in FIGS. 2A-2C are labeled with reference signs corresponding to the corresponding elements in FIGS. 1A-1B. Elements which differ from those in FIGS. 1A-1B will be described in detail below. For a detailed description of other elements, refer to the description of FIGS. 1A-1B.

The gripper 200 may include the following elements: a plate 201; a suction manifold 204; flowlines 205a-205d; suction cups 202a-202d; and attachment mechanisms 203a-203d. These elements will be described in detail below inasmuch as they differ from the corresponding elements described above with respect to FIGS. 1A-1B.

The plate 201 may provide support for other elements of the gripper 200, including the suction cups 202a-202d and the suction manifold 204. The plate 201 may include a body 207 on which the suction manifold 204 may be mounted. The plate 201 may be screwed onto the suction manifold 204 using screws 209. In some embodiments, the suction manifold 204 may be attached to the plate 201 via other means.

The plate 201 may include an external ring 224 extending from the body 207. The external ring 224 may be circular, as shown in FIGS. 2A-2C, or may have any other shape known in the art, such as an oval or polygon. The external ring 224 may comprise one or more slots 211a-211d. The slots 211a-211d may facilitate both the attachment of the suction cups 202a-202d to the plate 201 and the adjustment of the position of the suction cups 202a-202d. The slots 211a-211d may be curved and may have the same curvature as the external ring 224. The slots 211a-211d may all be the same length or may be different lengths. As discussed above with respect to FIGS. 1A-1B, the plate 201 may comprise rows of holes instead of slots. The rows of holes may be linear or curved.

The plate 201 may include a lip 225. The lip 225 may extend around the outer diameter of the external ring 224 and may extend both upwards and downwards. In some embodiments, the lip 225 may comprise one or more external components fit around the plate 201. For example, the lip 225 may be made of rubber which may be stretched slightly to fit snuggly with the plate 201. In some embodiments, the lip 225 may be an integral part of the plate 201.

As discussed above, the suction manifold 204 may be mounted on the body 207 of the plate 201. The suction manifold 204 may receive an input suction at an inlet (not illustrated) and may transfer this suction to one or more outlets 216. One or more outlets 216 may be fluidly connected to one or more suction cups 202a-202d. As shown in FIGS. 2A-2C, a single outlet 216 formed on the bottom surface of the manifold 204 may be fluidly connected to four suction cups 202*a*-202*d*. This outlet 216 may be outfitted with a fitting 218 connected to a T-connector 226*a* to facilitate attachment to two flowlines 205*a*, 205*b*. One or more other outlets (not illustrated) may be blocked, using either a plug or the plate 201. The suction manifold 204 will be described in more detail below with respect to FIGS. 5A-5D, which illustrate a suction manifold, fittings, and plugs.

In some embodiments, an alternate suction source, such as a vacuum pump (not illustrated) or a suction motor (not illustrated) may be used instead of the suction manifold 204. The vacuum pump may be mounted on the plate 201 in a similar manner to that which has been described for the suction manifold 204. The vacuum pump may be fluidly connected to each of the suction cups 202. The vacuum pump may be any type of pump known in the art. Sufficient suction may be understood to mean sufficient vacuum with sufficient air flow. The pump may be capable of providing sufficient suction to each of the suction cups 202 to grip objects as desired. The vacuum pump may be battery powered, or power may be provided to it via an electrical cable.

The flowlines 205*a*, 205*b* attached to the T-connector 226*a* may each be connected to a second T-connector 226*b*, 226*c* at their second ends. The second T-connectors 226*b*, 226*c* may each connect to flowlines 205*c*-205*f* which are attached to the attachment mechanisms 203*a*-203*d*. Accordingly, the flowlines 205*a*-205*f* may transfer suction from the manifold 204 to the attachment mechanisms 203*a*-203*d*.

The suction cups 202*a*-202*d* may have similar properties, features, and functions as the suction cups 102*a*, 102*b* described above with respect to FIGS. 1A-1B.

The attachment mechanisms 203*a*-203*d* may attach the suction cups 202*a*-202*d* to the plate 201, enable the adjustment of the position of the suction cups 202*a*-202*d* within the slots 211*a*-211*d*, and transfer suction from the flowlines 205*a*-205*d* to the suction cups 202*a*-202*d*. The attachment mechanisms 203*a*-203*d* may have similar features and functionality as the attachment mechanisms 103*a*, 103*b* described above with respect to FIGS. 1A-1B. Each attachment mechanism 203*a*-203*d* may include an upper cap 213*a*-213*d* and a lower cap 214*a*-214*d*. The lower caps 214*a*-214*d* may each include a threaded portion 215*a*-215*d*. The upper caps 213*a*-213*d* may each comprise a nut-like section 299*a*-299*d*. The nut-like sections 299*a*-299*d* may feature curved edges which allow them to be readily gripped by a human operator. Accordingly, the attachment mechanisms 203*a*-203*d* may be tightened, loosened, and positioned by hand.

The gripper 200 may further include a mounting component 206 and a lower cap 223. These elements may be similar to the mounting component 106 and the lower cap 123 illustrated in FIGS. 1A-1B.

Figure 3A:
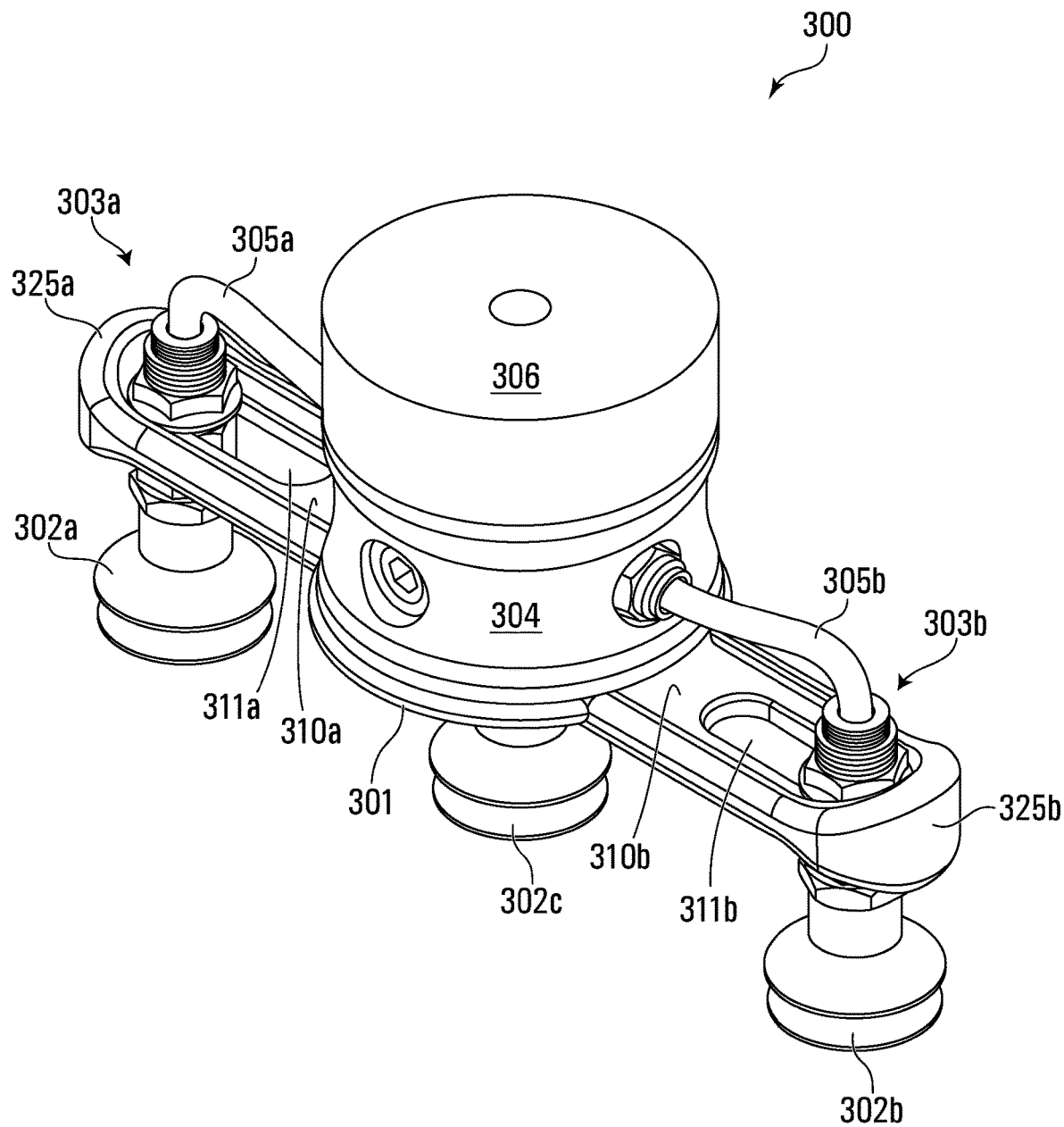
FIGS. 3A-3B are drawings of a gripper in accordance with the present disclosure.
Figure 3B:
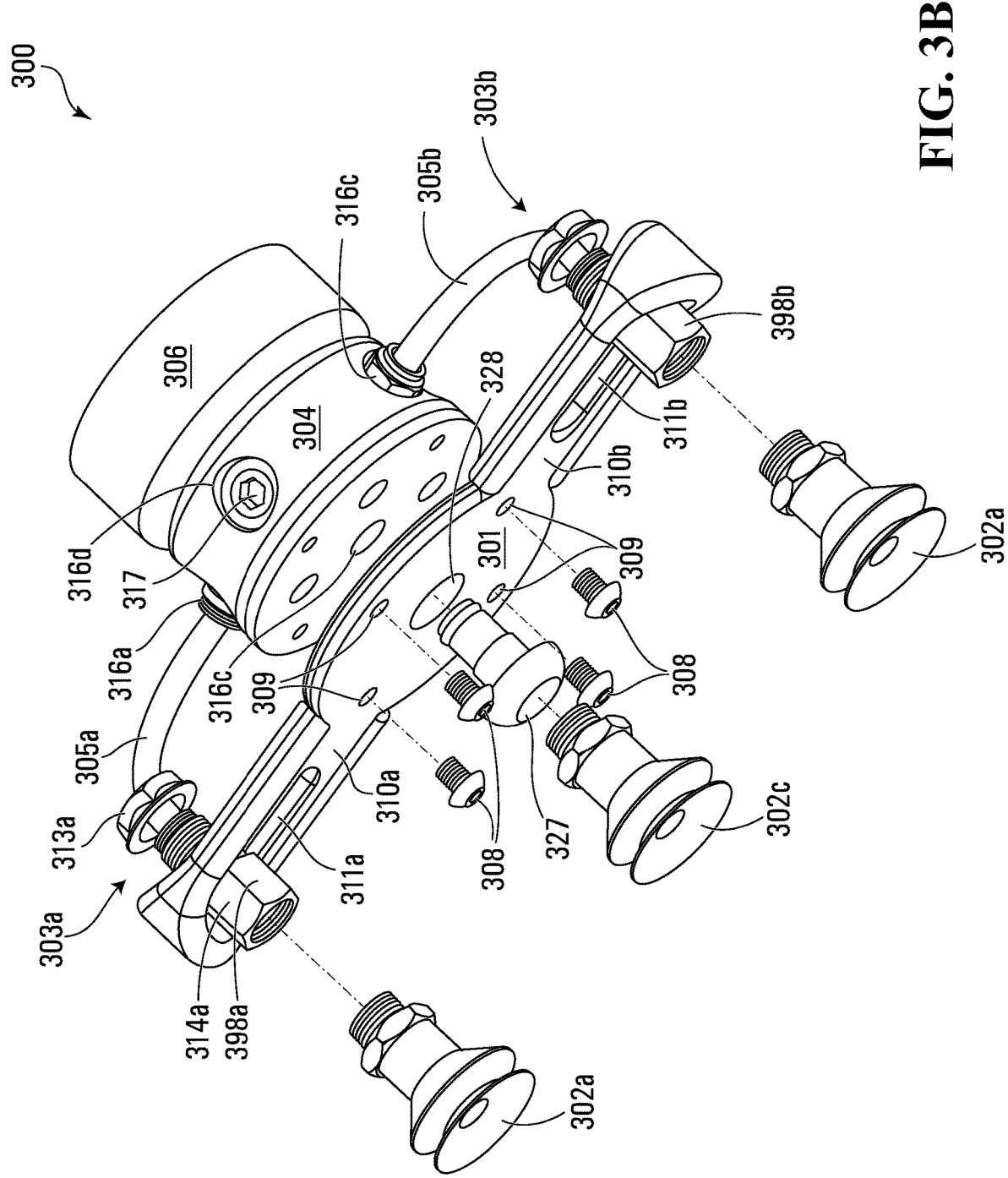

FIGS. 3A-3B illustrate a gripper 300. FIG. 3A shows a plan view of the gripper 300 as assembled and FIG. 3B shows an exploded view of the gripper 300. The gripper 300 may include many of the same elements as the gripper 100 illustrated in FIGS. 1A-1B and described in detail above. Elements in FIGS. 3A-3B are labeled with reference signs corresponding to the corresponding elements in FIGS. 1A-1B. Elements which differ from those in FIGS. 1A-1B will be described in detail below. For a detailed description of other elements, refer to the description of FIGS. 1A-1B.

The gripper 300 may include the following elements: a plate 301; a suction manifold 304; flowlines 305*a*, 305*b*; suction cups 302*a*-302*c*; and attachment mechanisms 303*a*, 303*b*. These elements will be described in detail below inasmuch as they differ from the corresponding elements described above with respect to FIGS. 1A-1B.

The plate 301 may provide support for other elements of the gripper 300, including the suction cups 302*a*-302*c* and the suction manifold 304. The plate 301 may include a body 307 on which the suction manifold 304 may be mounted. The plate 301 may be screwed onto the suction manifold 304 using screws 309. In some embodiments, the suction manifold 304 may be attached to the plate 301 via other means. The plate 301 may also include one or more arms 310*a*, 310*b* extending from the body 307. The arms may extend at an angle of 180° from each other, as shown in FIGS. 3A-3B, or may extend at any other angle, as discussed with respect to FIGS. 1A-1B. Each arm 310*a*, 310*b* may comprise a slot 311*a*, 311*b*, which may facilitate both the attachment of the suction cups 302*a*, 302*b* to the plate 301 and the adjustment of the position of the suction cups 302*a*, 302*b*. As discussed above with respect to FIGS. 1A-1B, the plate 301 may comprise rows of holes instead of slots. Each arm 310*a*, 310*b* may also comprise a lip 325*a*, 325*b* formed around its outer surface.

As discussed above, the suction manifold 304 may be mounted on the body 307 of the plate 301. The suction manifold 304 may receive an input suction at an inlet (not illustrated) and may transfer this suction to one or more outlets 316*a*-316*d*. One or more outlets 316*a*-316*c* may be fluidly connected to one or more suction cups 302*a*-302*c*. These outlets 316*a*-316*b* may be outfitted with fittings 318*a*-318*b* to facilitate attachment to the flowlines 305*a*, 305*b* or may be outfitted with an adapter 327 to facilitate direct attachment to a suction cup 302*c*. The adapter 327 may extend through a hole 328 in the plate 301. One or more other outlets 316*d* may be blocked using a plug 317. The suction manifold 304 will be described in more detail below with respect to FIGS. 5A-5D, which illustrate a suction manifold, fittings, and plugs.

In some embodiments, an alternate suction source, such as a vacuum pump (not illustrated) or a suction motor (not illustrated) may be used instead of the suction manifold 304. The vacuum pump may be mounted on the plate 301 in a similar manner to that which has been described for the suction manifold 304. The vacuum pump may be fluidly connected to each of the suction cups 302. The vacuum pump may be any type of vacuum pump known in the art. It may be capable of providing sufficient suction to each of the suction cups 302 to grip objects as desired. The vacuum pump may be battery powered, or power may be provided to it via an electrical cable.

The flowlines 305*a*, 305*b* attached to the outlets 316*a*, 316*b* of the suction manifold 304 may each be connected to an attachment mechanism 303*a*, 303*b* at their second ends. Accordingly, the flowlines 305*a*, 305*b* may transfer suction from the manifold to the attachment mechanisms 303*a*, 303*b*.

The suction cups 302*a*-302*c* may have similar properties, features, and functions as the suction cups 102*a*, 102*b* described above with respect to FIGS. 1A-1B. The first two suction cups 302*a*, 302*b* may also be attached to the other components of the gripper 300 in a similar manner to the suction cups 102*a*, 102*b* described above with respect to FIGS. 1A-1B. The third suction cup 302*c* may be attached to the adapter 327 connected to the lower outlet 316*c* of the manifold 304. This suction cup 302*c* may be fixed in position.

The attachment mechanisms 303*a*-303*b* may attach the first two suction cups 302*a*-302*b* to the plate 301, enable the adjustment of the position of the suction cups 302*a*-302*b* within the slots 311a-311b, and transfer suction from the flowlines 305a-305b to the suction cups 302a-302b. The attachment mechanisms 303a-303b may have similar features and functionality as the attachment mechanisms 103a, 103b described above with respect to FIGS. 1A-1B. Each attachment mechanism 303a-303b may include an upper cap 313a-313b and a lower cap 314a-314b. The lower caps 314a-314b may each include a threaded portion 315a-315b. The lower caps 314a-314b may each comprise a nut-like section 398a-398b. The nut-like sections 398a-398b may feature curved edges which allow them to be readily gripped by a human operator. Accordingly, the attachment mechanisms 303a-303b may be tightened, loosened, and positioned by hand.

The gripper 300 may further include a mounting component 306, which may be similar to the mounting component 106 illustrated in FIGS. 1A-1B. The gripper 300 may not include a lower cap.

Figure 4A:
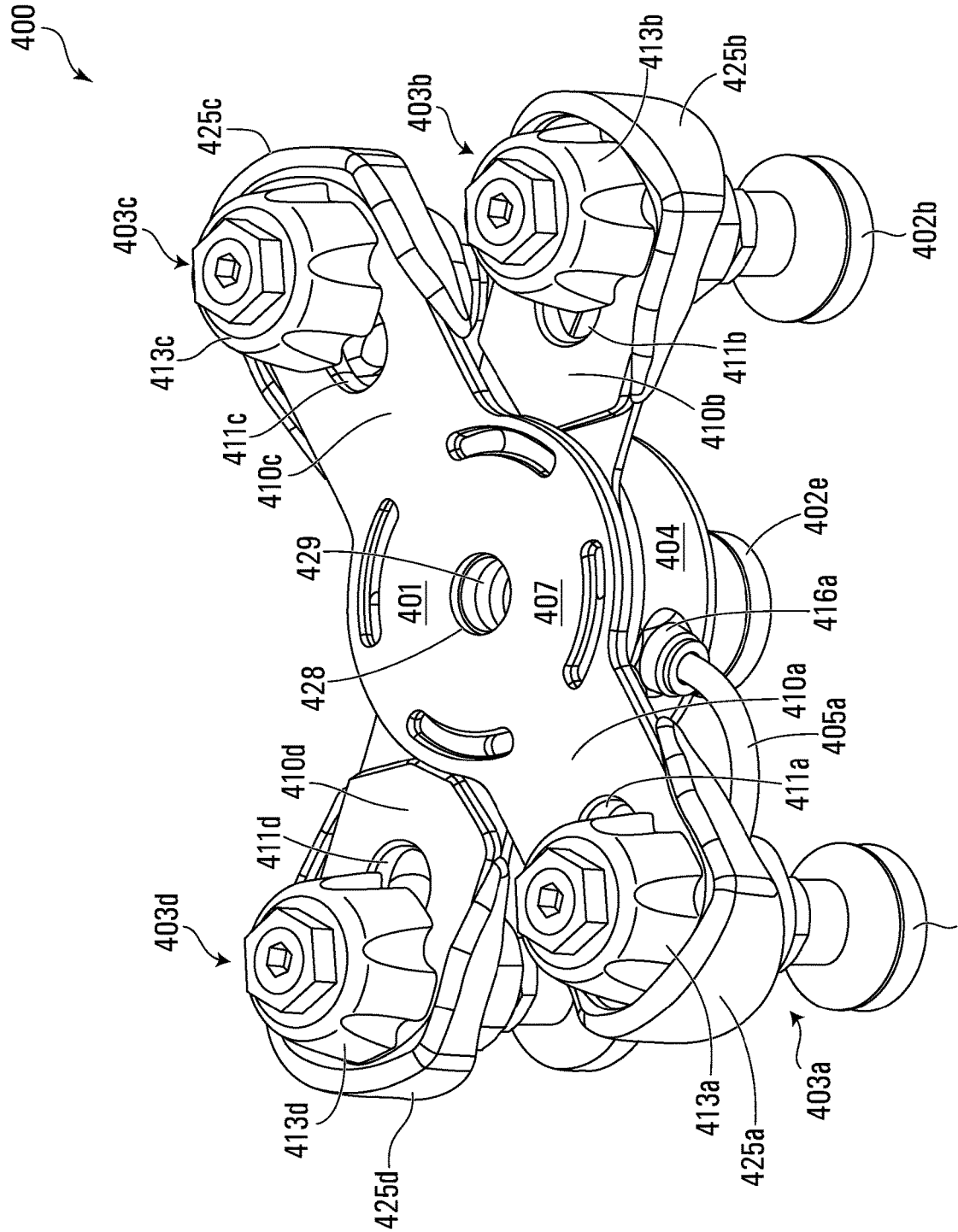
FIGS. 4A-4B are drawings of a gripper in accordance with the present disclosure.
Figure 4B:
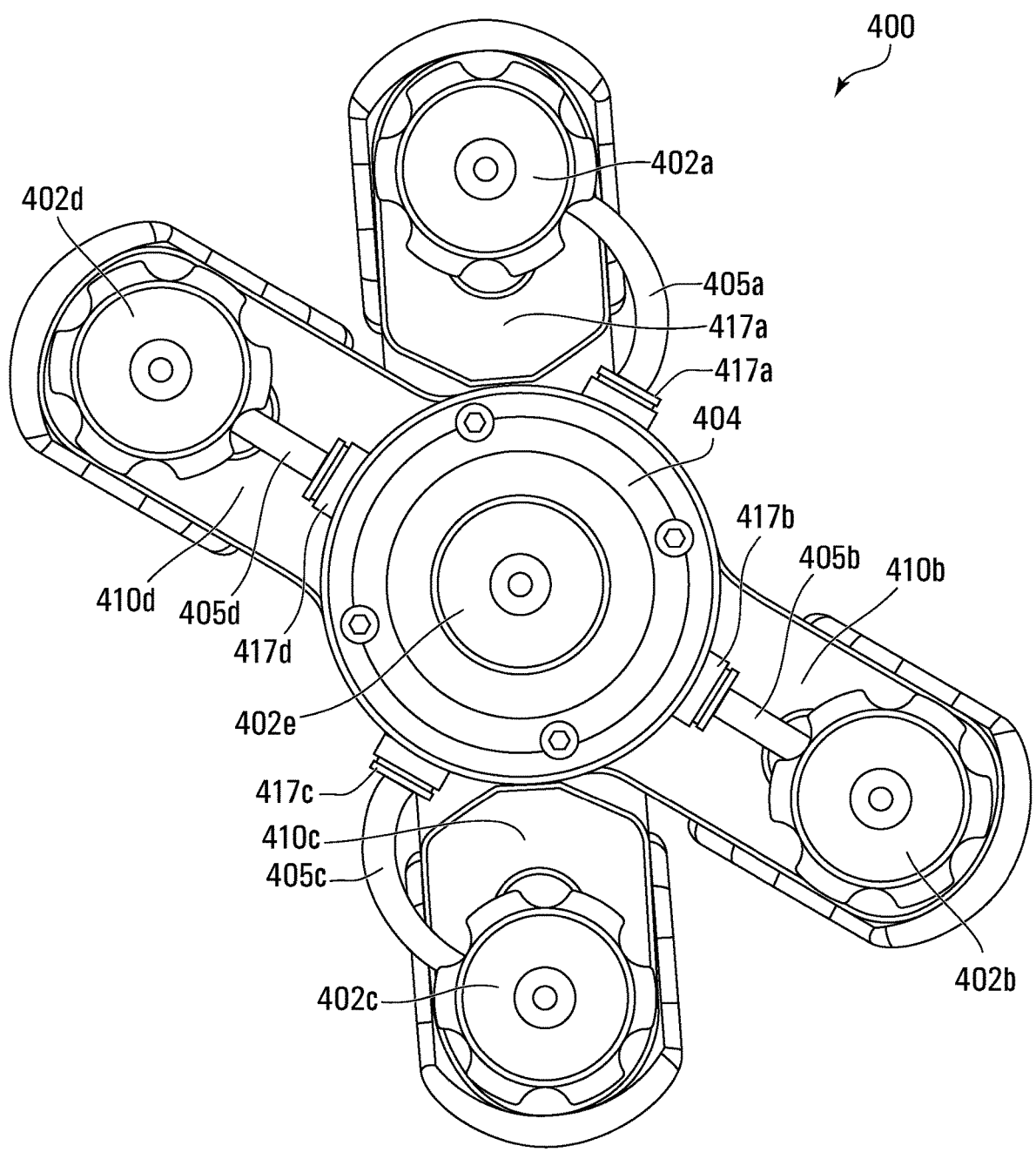

FIGS. 4A-4B illustrate a gripper 400. FIG. 4A shows a plan view of the gripper 400 as assembled and FIG. 4B shows a bottom view of the gripper 400. The gripper 400 may include many of the same elements as the gripper 100 illustrated in FIGS. 1A-1B and described in detail above. Elements in FIGS. 4A-4B are labeled with reference signs corresponding to the corresponding elements in FIGS. 1A-1B. Elements which differ from those in FIGS. 1A-1B will be described in detail below. For a detailed description of other elements, refer to the description of FIGS. 1A-1B.

The gripper 400 may include the following elements: plates 401a, 401b; a suction manifold 404; flowlines 405a-405d; suction cups 402a-402e; and attachment mechanisms 403a-403d. These elements will be described in detail below inasmuch as they differ from the corresponding elements described above with respect to FIGS. 1A-1B.

The plates 401a, 401b may provide support for other elements of the gripper 400, including the suction cups 402a-402e and the suction manifold 404. The plates 401a, 401b may each have two arms 410a-410d extending at 180° from each other. The plates 401a, 401b may be secured to each other to form a single structure having a body 407 and four arms 410a-410d. In some embodiments, it may be possible to secure the plates 401a, 401b to each other at different angles, such that different angles between the arms 410a-410d may be achieved. Although the gripper 400 is illustrated as having two plates 401a, 401b, one can readily envision similar structure being achieved with a single plate having four arms.

The suction manifold may be mounted on the body 407 of the plate. In contrast to the grippers 100-300 illustrated in FIGS. 1-3, in this gripper 400, the suction manifold 404 is disposed below the plate 401. The plate 401 may include a hole 428 which allows access to an inlet 429 of the suction manifold 404.

Each arm 410a-410d may comprise a slot 411a-411d, which may facilitate both the attachment of the suction cups 402a-402d to the plate 401 and the adjustment of the position of the suction cups 402a-402d. As discussed above with respect to FIGS. 1A-1B, the plate 401 may comprise rows of holes instead of slots. Each arm 410a-410d may also comprise a lip 425a-425d formed around its outer surface.

As discussed above, the suction manifold 404 may be mounted on the body 407 of the plate 401. The suction manifold 404 may receive an input suction at an inlet 429 and may transfer this suction to one or more outlets 416a (other outlets not illustrated). One or more outlets 416a-416e may be fluidly connected to one or more suction cups 402a-402e. These outlets 416a-416d may be outfitted with fittings 418a-418d to facilitate attachment to the flowlines 405a-405d or may be outfitted with an adapter (not illustrated) to facilitate direct attachment to a suction cup 402e. The suction manifold 404 will be described in more detail below with respect to FIGS. 5A-5D, which illustrate a suction manifold, fittings, and plugs.

In some embodiments, an alternate suction source, such as a vacuum pump (not illustrated) or a suction motor (not illustrated) may be used instead of the suction manifold 404. The vacuum pump may be mounted on the plate 401 in a similar manner to that which has been described for the suction manifold 404. The vacuum pump may be fluidly connected to each of the suction cups 402. The vacuum pump may be any type of pump known in the art. It may be capable of providing sufficient suction to each of the suction cups 402 to grip objects as desired. The vacuum pump may be battery powered, or power may be provided to it via an electrical cable.

The flowlines 405a-405d attached to the outlets 416a-416d of the suction manifold 404 may each be connected to an attachment mechanism 403a-403d at their second ends. Accordingly, the flowlines 405a-405d may transfer suction from the manifold 404 to the attachment mechanisms 403a-403d.

The suction cups 402a-402e may have similar properties, features, and functions as the suction cups 102a, 102b described above with respect to FIGS. 1A-1B. The first four suction cups 402a-402d may also be attached to the other components of the gripper 400 in a similar manner to the suction cups 102a, 102b described above with respect to FIGS. 1A-1B. The fifth suction cup 402e may be attached to the adapter connected to the lower outlet (not shown) located on a bottom face of the manifold 404. This suction cup 402e may be fixed in position.

The attachment mechanisms 403a-403d may attach the first four suction cups 402a-402d to the plate 401, enable the adjustment of the position of the suction cups 402a-402d within the slots 411a-411d, and transfer suction from the flowlines 405a-405d to the suction cups 402a-402d. The attachment mechanisms 403a-403d may have the same structure, features, and functionality as the attachment mechanisms 103a, 103b described above with respect to FIGS. 1A-1B. Accordingly, the attachment mechanisms 403a-403d may be tightened, loosened, and positioned by hand.

As discussed above, a gripper in accordance with the present disclosure may include some or all of the features of any of the illustrated embodiments and may include a combination of features illustrated in different embodiments. One skilled in the art can readily envision how the plate configuration, attachment mechanisms, manifold position, flowline configuration, and other features of each illustrated embodiment might be mixed-and-matched to produce a wide variety of grippers. These grippers fall within the scope of the present disclosure.

FIGS. 5A-5D illustrate a suction manifold 504, a fitting 518, and a plug 517. The suction manifold 504 and its accessories may be used in any of the exemplary grippers 100-400 described above.

Figure 5A:
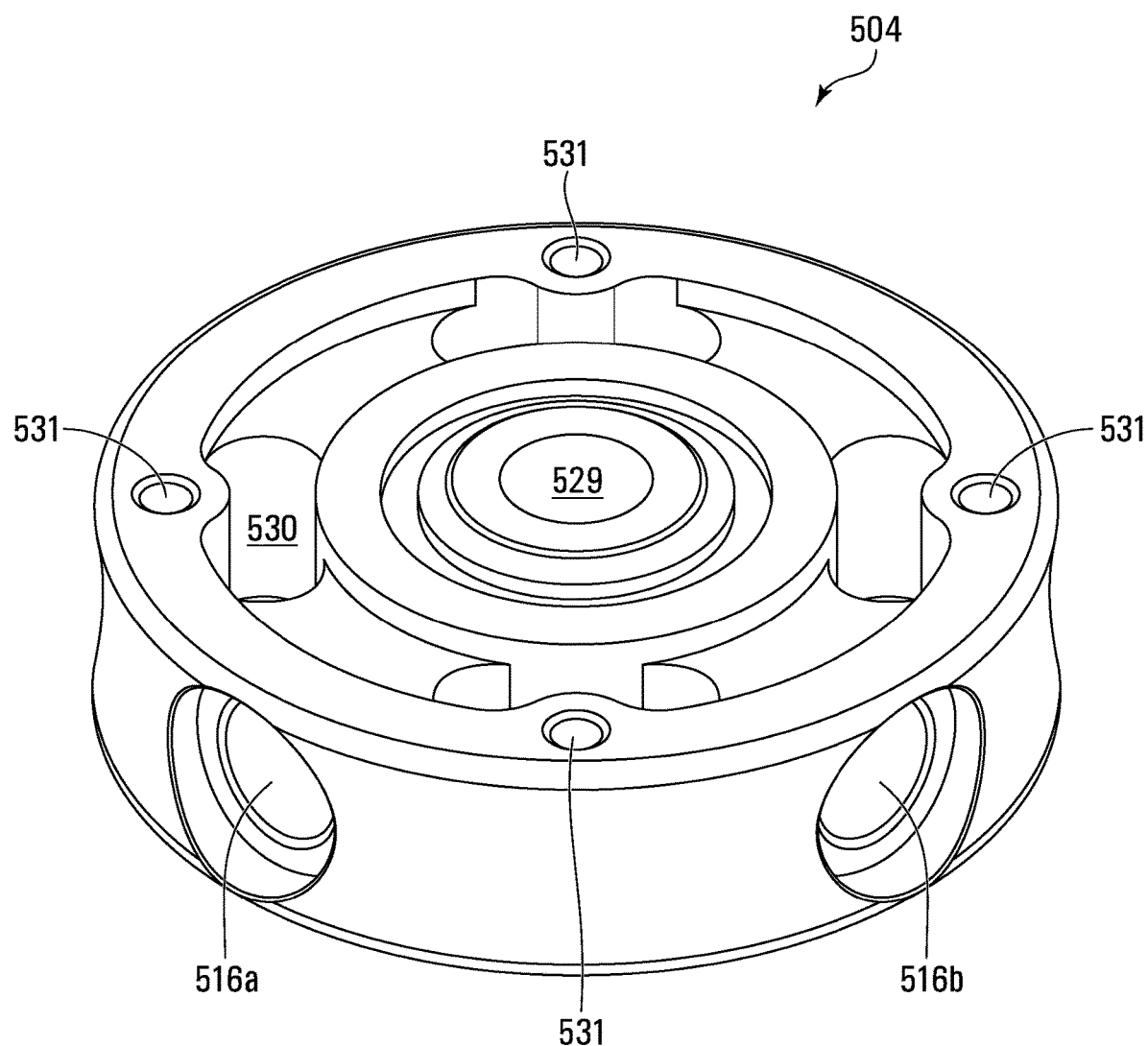
FIGS. 5A-5D are drawings of a manifold, fittings, and plugs in accordance with the present disclosure.

FIG. 5A illustrates a suction manifold 504. The suction manifold 504 may have a generally puck-like cylindrical shape. The suction manifold 504 may include an inlet 529 formed on its top surface and multiple outlets 516a-516b formed on its side surface and bottom surface. FIG. 5A shows two outlets 516a-516b formed on the side surface of the suction manifold 504. It will be understood that the number of outlets may vary without departing from the present teachings, as a function of the configuration of the gripper. Additional outlets on the side surface and an outlet on the bottom surface are not visible. The inlet 529 and the outlets 516a-516b may be fluidly connected via an internal flowpath 530. An exemplary manifold flowpath 530 is shown in FIG. 5A, but one skilled in the art can readily envision myriad paths which could connect the inlet 529 to the outlets 516a-516b. The internal flowpath 530 may be configured such that the necessary amount of suction can be readily transferred to all of the outlets 516a-516b. The internal flowpath 530 may also be configured such that the suction manifold 504 retains sufficient material to be able to withstand applied forces and torques without being deformed. The suction manifold 504 may also include holes 531 or other features to allow it to be attached to other components of a gripper. The manifold 504 may allow a gripper to be significantly more compact and may reduce the number and length of flowlines needed to provide suction to the suction cups of the gripper. This may make the gripper less complex and easier to use.

Figure 5B:
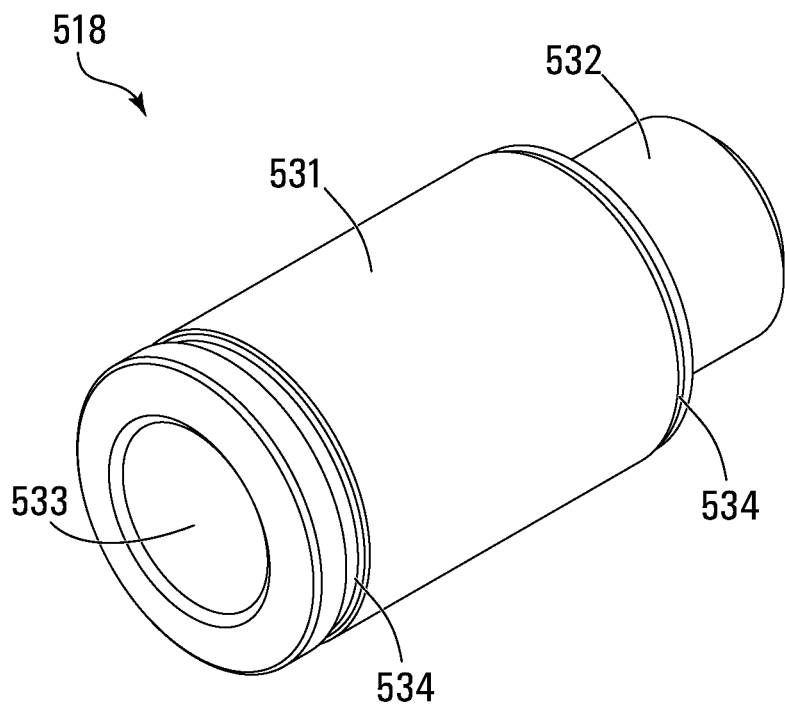
Figure 5C:
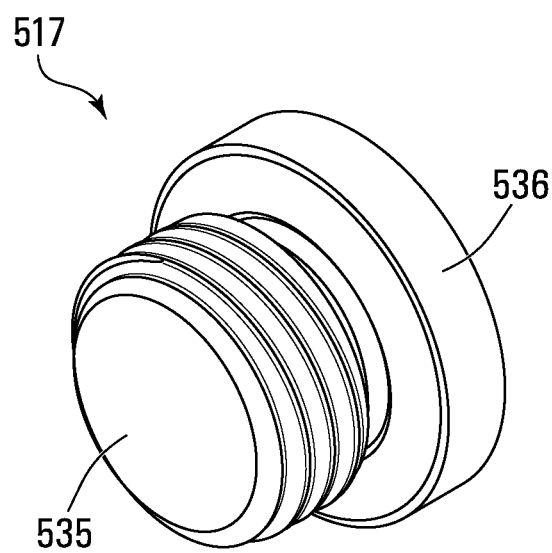
Figure 5D:
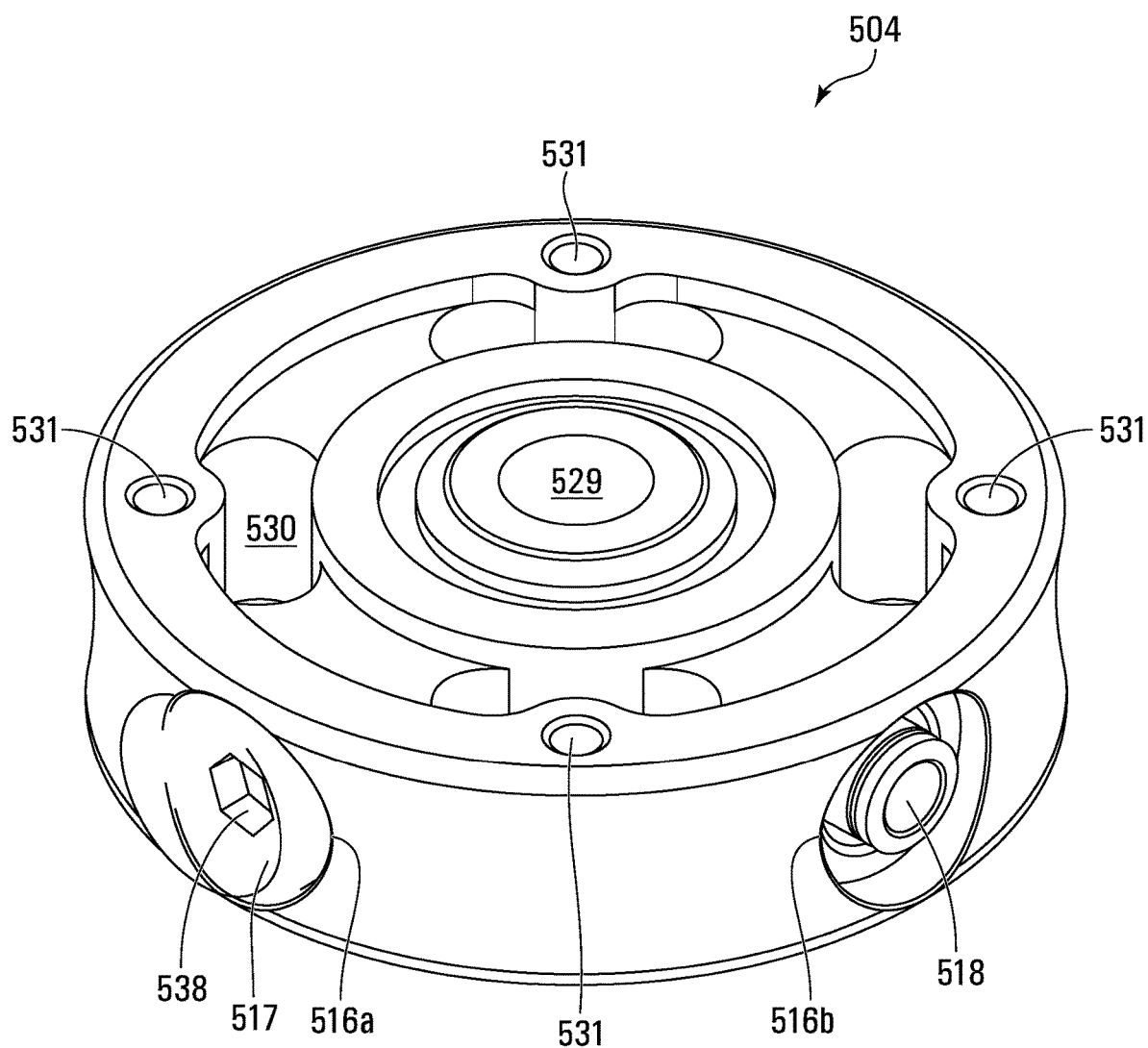

FIG. 5B illustrates a fitting 518 and FIG. 5D illustrates a fitting 518 attached to a manifold 504. The fitting 518 may be configured to form a connection between an outlet 516b of a manifold 504 and a flowline (not illustrated) or other component. The fitting 518 may have a generally cylindrical configuration comprising a main body 531 and an extension 532. A bore 533 may extend through the main body 531 and the extension 532. The main body 531 may include gripping features such as ridges 534 or threads. FIG. 5B shows ridges 534 proximate the ends of the main body 531; however, the gripping features may be formed over any portion of the main body 531. As shown in FIG. 5D, the main body 531 of the fitting 518 may extend from the outlet 516b.

FIG. 5C illustrates a plug 517 and FIG. 5D illustrates a plug 517 connected to a manifold 504. The plug 517 may be configured to stop an outlet 516a of a manifold 504. The plug 517 may comprise a cap 535 and a narrower extension 536. The cap 535 may remain on the outside of the manifold 504 when the components are assembled, while the extension 536 may extend into an outlet 516a of the manifold. The extension 536 may include gripping features such as ridges or threads 537. As shown in FIG. 5D, the cap 535 may include a hex hole 538 or other features to allow it to be screwed into the outlet 516a.

As discussed above, some embodiments of the present disclosure are directed towards methods of using grippers in a collaborative environment. One skilled in the art will recognize that a method may include some or all of the steps below performed in the order prescribed below or performed in a different order without departing from the scope of the disclosure. Further, a method may include steps not described below in combination with some or all of the steps described below without departing from the scope of the present disclosure.

Methods of the present disclosure may use grippers which have been detailed above and/or grippers which have not been detailed above. The grippers described above comprise suction grippers which are adjusted via adjustment mechanisms. Grippers used in the following methods may or may not be suction grippers, and may or may not be adjusted via the adjustment mechanisms described above. Exemplary grippers which may be used in these methods will be described below in more detail.

Figure 6:
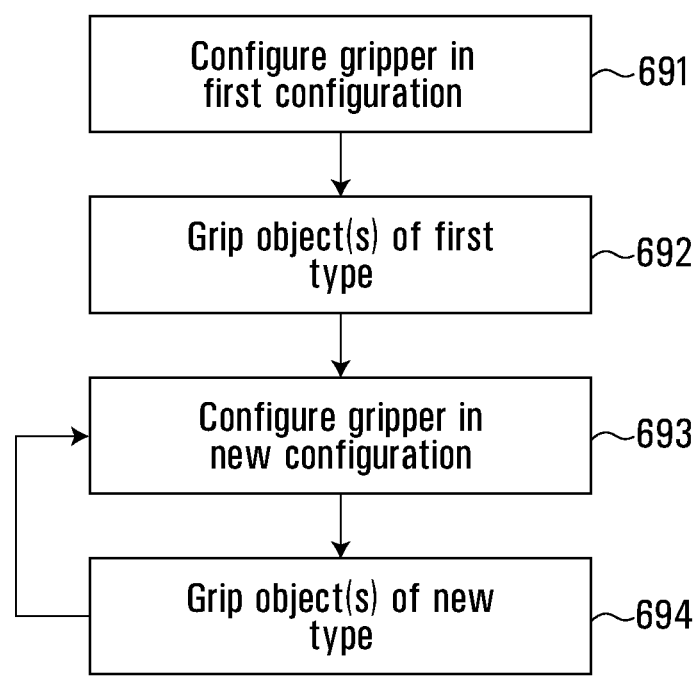
FIG. 6 is a flowchart of a method in accordance with the present disclosure.

FIG. 6 is a flowchart outlining an exemplary method of using a gripper. The gripper may be the end-effector of a robotic arm or other robot. In some embodiments, the gripper may be used in a collaborative environment in which humans and robots work alongside each other. Accordingly, the gripper and any associated robot may be safe for operation in collaborative environments.

In step 691, the gripper may be configured in a first configuration. The configuration may be based on the first type of objects which the gripper will be used to lift. For example, the gripper may be configured based on the size, weight, surface features, and/or other properties of the objects. The gripper may be configured by hand by a human operator. In other words, the gripper may be designed such that a human operator may configure it without tools. If the gripper is a gripper which has been described above, configuring the gripper may comprise adjusting each adjustment mechanism such that the suction cups are in a desired position. A human operator may loosen, position, and tighten one or more of the adjustment mechanisms of the gripper. If the gripper is a different type of gripper, the human operator may manipulate different adjustment mechanisms. For example, a gripper used in this method may include telescoping arms and or rotatable components which can be locked into different positions.

In step 692, the gripper may be used to grip one or more objects of the first type. If the gripper is a suction gripper, gripping the objects may comprise applying suction to the objects. If the gripper is a different type of gripper, gripping the objects may comprise applying force in a different manner, for example by applying a magnetic field. While the gripper is gripping the objects, the robotic arm or other robot to which it is attached may lift or move the objects. In some embodiments, another robot or human operator may perform an operation on the objects while they are lifted. The objects may or may not be identical to each other. If the objects are not identical to each other, they may have similarities that allow them to be gripped by the gripper in the same configuration. This step may continue until all of the objects of the first type have been lifted.

In step 693, the gripper may be configured in a new configuration. The same process used to configure the gripper in step 691 may be used to reconfigure it in step 693. In step 694, the gripper may be used to grip object(s) of a new type. The same process used to grip the first type of objects in step 692 may be used to grip the new type of objects in step 694. Steps 693 and 694 may be repeated as many times as desired. In this way, the method may allow for any number of types of objects to be gripped and operated on. The method may conclude when all necessary objects have been lifted. At the conclusion of the method, the gripper may or may not be reconfigured and may or may not be removed from the robotic arm or other robot on which it is disposed.

Advantages of the grippers and methods disclosed herein have been discussed throughout the disclosure. They are further detailed here. The present disclosure may allow for a single gripper to be used to lift a variety of objects by allowing the gripper to be readily reconfigured. This may allow a single gripper to lift objects of different sizes, weights, and/or surface structures. The gripper may also be configured to avoid gripping fragile features of an object. Further, the present disclosure may the gripper to be readily reconfigured by hand. This may increase the speed at which the gripper can be reconfigured, and may thereby decrease the time, cost, or personnel necessary to perform an operation using the gripper. This may make grippers and methods according to the present disclosure particularly advantageous for operations in collaborative environments.

What is claimed is:

1. A gripper comprising:
   a plate comprising a body and one or more extremities, each extremity comprising one or more attachment features; and
   one or more suction cups, each attached to the plate via an attachment mechanism extending through one of the attachment features and fluidly connected to a source of suction,
   wherein each attachment mechanism is adjustable within one of the attachment features,
   wherein each attachment mechanism is configured to be tightened, loosened, and repositioned by hand; and
   wherein each of the one or more attachment mechanisms comprises:
      an upper cap disposed above the plate and comprising a threaded portion extending through one slot of one or more slots of said plate; and
      a lower cap disposed below the plate, attached to the upper cap, and attached to one of the one or more suction cups.

2. The gripper of claim 1, wherein the upper caps and the lower caps are configured to be screwed together.

3. The gripper of claim 1, wherein at least one of the upper caps and the lower caps comprises gripping features.

4. The gripper of claim 1, wherein a flowpath is formed through the upper cap and the lower cap.

5. The gripper of claim 1, wherein each suction cup is screwed onto one of the one or more attachment mechanisms.

6. The gripper of claim 1, wherein the one or more extremities comprise one or more arms.

7. The gripper of claim 1, wherein the one or more extremities comprises an external ring.

8. The gripper of claim 1, wherein the source of suction comprises a suction manifold mounted on the body of the plate.

9. The gripper of claim 8, wherein the manifold is fluidly connected to the suction cups via one or more flexible tubes.

10. The gripper of claim 8, wherein the manifold comprises one or more outlets and each outlet is fluidly connected to one of the one or more suction cups.

11. The gripper of claim 1, wherein each of the attachment mechanisms is configured to be tightened and loosened using less than three Newton-meters of torque.

12. The gripper of claim 1, further comprising a mounting component.

13. A system comprising the gripper of claim 1 and a robot, wherein the gripper is configured as an end effector of the robot.

14. The system of claim 13, wherein the robot is a robotic arm.

15. The gripper of claim 1, wherein the one or more attachment features comprise one or more slots and wherein each attachment mechanism is adjustable within one of the slots.

16. The gripper of claim 1, wherein the one or more attachment features comprise one or more rows of holes, and wherein each attachment mechanism is movable between holes in a row of holes.

17. A method of gripping one or more objects using a gripper, the method comprising:
   providing a gripper comprising:
      a plate comprising a body and one or more extremities, each extremity comprising one or more attachment features; and
      one or more suction cups, each attached to the plate via an attachment mechanism extending through one of the attachment features and fluidly connected to a source of suction,
      wherein each attachment mechanism is adjustable within one of the attachment features,
      wherein each attachment mechanism is configured to be tightened, loosened, and repositioned by hand; and
      wherein each of the one or more attachment mechanisms comprises:
         an upper cap disposed above the plate and comprising a threaded portion extending through one slot of one or more slots of said plate; and
         a lower cap disposed below the plate, attached to the upper cap, and attached to one of the one or more suction cups:
   configuring the gripper in a first configuration;
   gripping one or more objects of a first type;
   configuring the gripper in a second configuration different from said first configuration;
   gripping one or more of the objects of a second type different from said first type, wherein configuring the gripper comprises adjusting the gripper by hand.

18. The method of claim 17, wherein configuring the gripper comprises:
   loosening one or more attachment mechanisms of the gripper;
   positioning the one or more attachment mechanisms; and
   tightening one or more attachment mechanisms.

19. The method of claim 18, further comprising configuring the gripper in a third configuration and said gripping one or more of the objects of a third type.

20. The method of claim 17, wherein configuring the gripper comprises applying three Newton-meters or less of torque to one or more of the attachment mechanisms.

21. The method of any one of claim 17, wherein gripping the one or more objects of each type comprises applying suction force to the object.

22. A gripper comprising:
   a plate comprising a body and one or more extremities, each extremity of the one or more extremities comprising one or more attachment features;
   one or more suction cups, each attached to the plate via an attachment mechanism extending through one of the attachment features and fluidly connected to a source of suction;
   wherein each attachment mechanism is adjustable within one of the attachment features,
   wherein each attachment mechanism is configured to be tightened, loosened, and repositioned by hand; and
   wherein each of the one or more attachment mechanisms comprises:
      an upper cap disposed above the plate; and
      a lower cap disposed below the plate, attached to the upper cap, and attached to one of the one or more suction cups,
      wherein at least one of said upper cap and said lower cap as a portion extending through one of the one or more slots.

* * * * *